United States Patent
Shauh (10) Patent No.: US 11,023,880 B2
(45) Date of Patent: Jun. 1, 2021

(54) ONLINE MOBILE PAYMENT SYSTEM AND METHOD USING AUTHENTICATION CODES

(71) Applicant: Jack Shauh, San Diego, CA (US)

(72) Inventor: Jack Shauh, San Diego, CA (US)

(73) Assignee: VRAY INC., San Diego, CA (US)

( * ) Notice: Subject to any disclaimer, the term of this patent is extended or adjusted under 35 U.S.C. 154(b) by 623 days.

(21) Appl. No.: 15/657,175

(22) Filed: Jul. 23, 2017

(65) Prior Publication Data

US 2018/0025342 A1    Jan. 25, 2018

Related U.S. Application Data

(60) Provisional application No. 62/365,996, filed on Jul. 23, 2016, provisional application No. 62/439,566, filed on Dec. 28, 2016.

(51) Int. Cl.
*G06Q 20/32* (2012.01)
*G06Q 20/40* (2012.01)

(52) U.S. Cl.
CPC ....... *G06Q 20/325* (2013.01); *G06Q 20/4012* (2013.01); *G06Q 20/40145* (2013.01)

(58) Field of Classification Search
CPC .. G06Q 20/325; G06Q 20/02; G06Q 20/4012; G06Q 20/40145; G06Q 20/383; G06Q 30/06
USPC .......................................................... 705/44
See application file for complete search history.

(56) References Cited

U.S. PATENT DOCUMENTS

| | | | | |
|---|---|---|---|---|
| 6,240,183 B1 * | 5/2001 | Marchant | ............ | G06F 12/1408 380/28 |
| 6,584,454 B1 * | 6/2003 | Hummel, Jr. | ....... | G06F 21/6218 705/1.1 |
| 7,295,997 B2 * | 11/2007 | Estes | ...................... | G06Q 10/08 705/26.8 |
| 7,779,103 B1 * | 8/2010 | Fikes | .................. | G06F 21/6263 709/223 |
| 8,661,257 B2 * | 2/2014 | Laitinen | ................ | H04L 9/0861 713/171 |
| 8,762,283 B2 * | 6/2014 | Gerber | ................... | G06Q 20/40 705/74 |
| 8,856,869 B1 * | 10/2014 | Brinskelle | ........... | G06F 21/6218 726/2 |
| 9,203,818 B1 * | 12/2015 | Roth | ....................... | H04L 63/08 |
| 10,043,186 B2 * | 8/2018 | Hammad | ........... | G06Q 20/3674 |
| 10,049,360 B2 * | 8/2018 | Hammad | ............... | G06Q 20/40 |

(Continued)

*Primary Examiner* — Slade E Smith (74) *Attorney, Agent, or Firm* — Parsons & Goltry; Robert Parsons; Michael Goltry (57) ABSTRACT

A mobile payment method includes the steps of making an online purchase at an online store with payment information being received by a web browsing capable device. The web browsing capable device connects to a server and a payment request including a VID is sent to the server. The server verifies the VID. A mobile payment device is connected to the server. A token request is sent to the mobile device upon verification of the VID. A token response is sent to the server. Information is archived to a database and a cookie associated with the VID is created. The cookie with associated VID is archived. A payment response is sent to the web browsing capable device. An authorization request is sent to the online store, and the online store authorizes the transaction with a payment network.

14 Claims, 9 Drawing Sheets

(56) References Cited

U.S. PATENT DOCUMENTS

| | | | |
|---|---|---|---|
| 2002/0035539 A1* | 3/2002 | O'Connell | G06Q 20/32 705/39 |
| 2002/0059119 A1* | 5/2002 | Wiebe | G06F 3/0321 705/26.1 |
| 2002/0078177 A1* | 6/2002 | Dutta | G06F 16/957 709/219 |
| 2002/0161723 A1* | 10/2002 | Asokan | H04W 12/0609 705/67 |
| 2002/0165821 A1* | 11/2002 | Tree | G06Q 20/04 705/39 |
| 2002/0169608 A1* | 11/2002 | Tamir | G06K 19/077 704/246 |
| 2003/0069792 A1* | 4/2003 | Blumenthal | G06Q 20/3229 705/16 |
| 2003/0119478 A1* | 6/2003 | Nagy | G06O 20/341 455/408 |
| 2003/0158960 A1* | 8/2003 | Engberg | G06Q 20/02 709/237 |
| 2003/0200184 A1* | 10/2003 | Dominguez | G06Q 20/3674 705/78 |
| 2004/0029569 A1* | 2/2004 | Khan | G06Q 20/327 455/414.1 |
| 2004/0030659 A1* | 2/2004 | Gueh | G06Q 30/06 705/67 |
| 2005/0044224 A1* | 2/2005 | Jun | G06Q 40/00 709/225 |
| 2007/0011093 A1* | 1/2007 | Tree | G06Q 20/10 705/40 |
| 2009/0076966 A1* | 3/2009 | Bishop | G07F 7/0866 705/67 |
| 2009/0292619 A1* | 11/2009 | Kagan | G06Q 20/102 705/26.1 |
| 2010/0198911 A1* | 8/2010 | Zhang | H04L 67/146 709/203 |
| 2013/0036355 A1* | 2/2013 | Barton | H04N 21/2543 715/719 |
| 2013/0046656 A1* | 2/2013 | Koskelainen | G06Q 20/12 705/26.41 |
| 2013/0117817 A1* | 5/2013 | Gantman | H04L 63/1466 726/4 |
| 2013/0246266 A1* | 9/2013 | Coleman | G06Q 30/0641 705/44 |
| 2013/0246563 A1* | 9/2013 | Cardozo | G06F 16/955 709/217 |
| 2013/0346302 A1* | 12/2013 | Purves | G06Q 20/108 705/40 |
| 2014/0074637 A1* | 3/2014 | Hammad | G06Q 20/325 705/21 |
| 2014/0189808 A1* | 7/2014 | Mahaffey | H04L 63/0853 726/4 |
| 2014/0249901 A1* | 9/2014 | Qawami | G06Q 30/0226 705/14.17 |
| 2014/0257999 A1* | 9/2014 | Garcia-Martinez | G06Q 30/0275 705/14.71 |
| 2014/0258136 A1* | 9/2014 | Ellis | G06Q 20/4016 705/76 |
| 2014/0279541 A1* | 9/2014 | Castrechini | G06Q 20/3274 705/44 |
| 2014/0298443 A1* | 10/2014 | Amaro | H04L 63/08 726/9 |
| 2015/0026062 A1* | 1/2015 | Paulsen | G06Q 30/0279 705/44 |
| 2015/0206139 A1* | 7/2015 | Lea | G06O 20/02 705/44 |
| 2015/0248664 A1* | 9/2015 | Makhdumi | G06Q 20/3276 235/380 |
| 2015/0269559 A1* | 9/2015 | Inotay | G06Q 20/3274 705/44 |
| 2016/0080367 A1* | 3/2016 | Roth | H04L 63/0807 726/9 |
| 2016/0300237 A1* | 10/2016 | Khan | G06Q 20/3276 |
| 2016/0314460 A1* | 10/2016 | Subramanian | G06Q 20/32 |
| 2017/0316400 A1* | 11/2017 | Venkatakrishnan | G06Q 20/3674 |
| 2018/0174137 A1* | 6/2018 | Subbarayan | G06Q 20/12 |
| 2018/0232729 A1* | 8/2018 | Goldstone | G06Q 20/322 |
| 2019/0273753 A1* | 9/2019 | Shirley | H04L 63/1416 |

* cited by examiner

FIG. 6, FIG. 7: HTTP Header – Set Cookie w/ public cookie

Set-Cookie: xyz=9abcdef; Expires=Sat, 01 Jan 2050 00:00:00 GMT; Domain=xyz.com; Secure; HttpOnly

FIG. 8B

FIG. 6: HTTP Header – Set Cookie w/ non-public cookie

Set-Cookie: xyz=1hijklm; Expires=Sat, 01 Jul 2050 00:00:00 GMT; Domain=xyz.com; Secure; HttpOnly

FIG. 8C

FIG. 7: HTTP Header – Set Cookie w/ non-public cookie

Set-Cookie: xyz=1hijklm; Expires=Sat, 01 Jul 2017 00:00:00 GMT; Domain=xyz.com; Secure; HttpOnly

FIG. 9

ONLINE MOBILE PAYMENT SYSTEM AND METHOD USING AUTHENTICATION CODES

CROSS-REFERENCE TO RELATED APPLICATION

This application claims the benefit of U.S. Provisional Application No. 62/365,996, filed 23 Jul. 2016, and of U.S. Provisional Application No. 62/439,566, filed 28 Dec. 2016.

FIELD OF THE INVENTION

This invention relates to mobile payment systems.

More particularly, the present invention relates to mobile payment for online purchases including the use of authentication codes.

BACKGROUND OF THE INVENTION

In the payments industry, mobile payments systems are becoming more widely used. Mobile payment applications as a virtual credit/debit card are starting to be provided to mobile devices such as smart phones, tablets, watches and other wearable devices, and the like. Mobile payment methods currently include Apple Pay, Android Pay, Samsung Pay etc. As an example, a mobile device capable of mobile payment, can be used in a point of sale (POS) terminal to pay for a sale in a retailer store. Mobile payment can provide strong security to prevent fraud by implementing EMV (Europay, MasterCard and Visa) Integrated Circuit Card Specifications for Payment Systems. Furthermore, mobile payment can provide strong security by implementing EMV Payment Tokenization Specifications, or a vendor specific payment token scheme.

Figure 1:
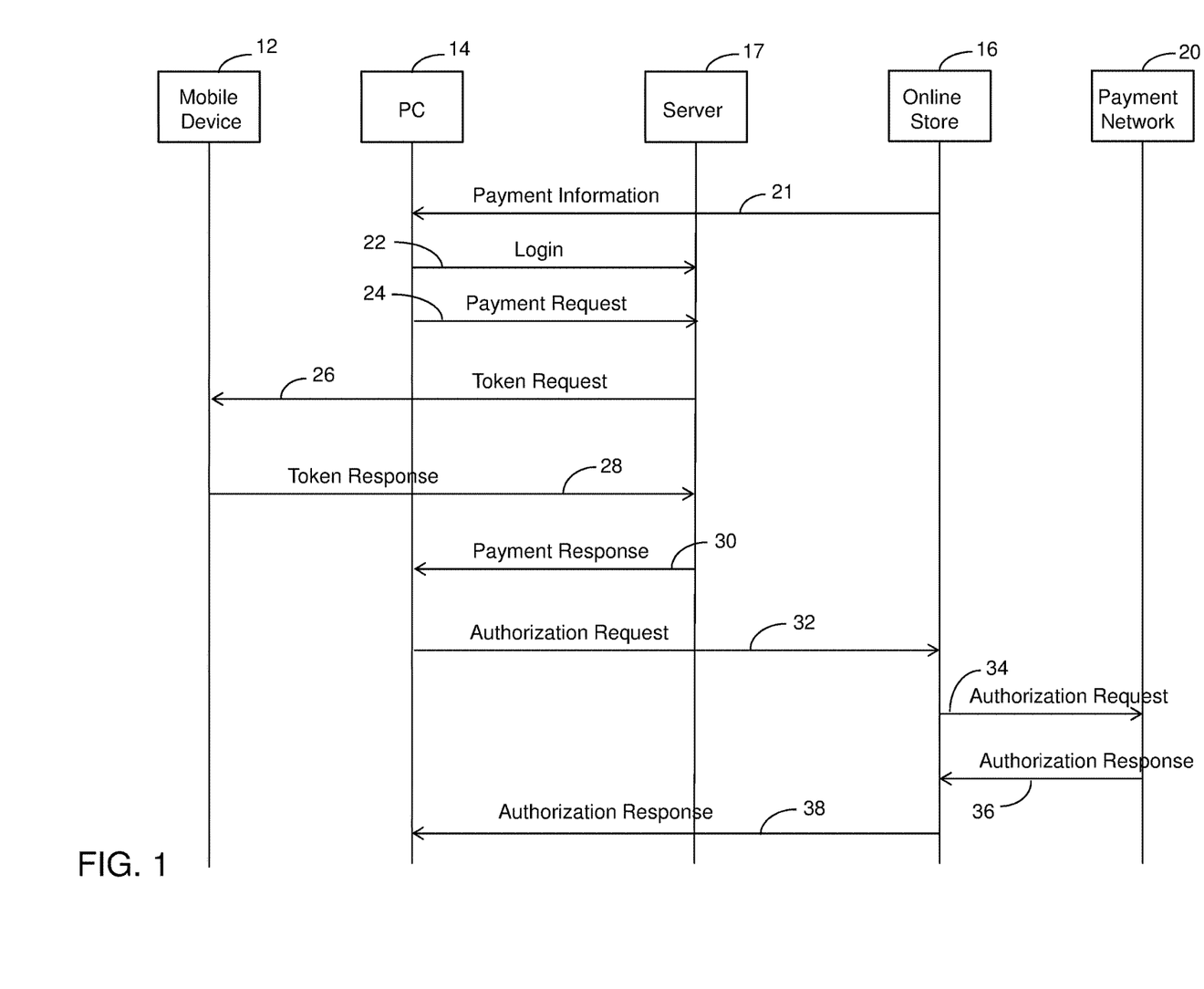
FIG. 1 is a schematic of a message exchange between elements of a payment system and a user in a prior art method.

A mobile payment system and method has been disclosed in U.S. patent application Ser. No. 15/585,962, filed on 3 May 2017 and herein incorporated by reference. An example of the message flow of this method and system is illustrated in FIG. 1. To provide the required functionality, browser of a PC 14 can run a software script from the web page of an online store 16. A mobile payment device 12 can install 3rd party software to enable these messages and procedures. Alternatively, PC 14 may need to install 3rd party software to enable these messages and procedures. Online store 16 also needs some software plugin, such as in the web page to provide a software script, to run in the browser context of PC 14 to convey data or messages between online store 16 and a server 17.

The user uses PC 14 to browse products of online store 16 and add selected products to the shopping cart well known in the art. The user purchases on the web page of online store 16 and receives payment information 21 from online store 16. Payment information 21 can include the product being purchased, shipping information, billing information, etc. Payment information 21 can also include payment amount, merchant identity, transaction time, transaction identity, the address of Server 17 (e.g. HTTP URL address), billing information, etc. The user then performs a login step 22 to set up a session with server 17. Login 22 is accomplished by providing a user name and a password to access server 17. Alternatively, PC 14 uses HTTP CORS (Cross-Origin Resource Sharing) to switch to another context and set up a HTTPS session with Server 17 using the address of Server 17 from Payment information 21. PC 14 then sends a payment request 24 to server 17. Payment request 24 can include payment amount, merchant identity, transaction time, transaction identity, mobile identity, billing information, etc. Mobile identity is provided by the user in this step to identify the mobile device to be used. Alternatively, sending a mobile identity is unnecessary and server 17 can instead retrieve the mobile identity for the mobile device from its database by using the username in the login procedure. Mobile identity can be a mobile phone number, a mobile device hardware identity, or an email address that is associated with a mobile device, and the like.

Server 17 receives payment request 24 and sends token request 26, including information such as payment amount, merchant identity, transaction time, transaction identity and the like, to mobile device 12. Server 17 knows the correct mobile device 12 to communicate with by using the mobile identity. For example, if the telephone number of the mobile device is known, server 17 can send an SMS to mobile device 12 to trigger a data session set up. Or mobile device 12 continues to maintain a HTTP (or HTTPS) session with server 17 with the mobile identity of the HTTP (or HTTPS) session. Then server 17 can push the payment information in token request 26 to mobile device 12. Payment information includes payment amount, merchant identity, transaction time, transaction identity, etc. Or a push notification network (not shown in the figure), e.g. Apple Push Notification Service, Google Cloud Messaging, Windows Push Notification Service, can be used to forward messages.

Upon receiving token request 26, mobile device 12 displays payment information to the user for confirmation, and prompts the user to enter PIN (or passcode), fingerprint, or the like, and generates a payment token after the PIN (or passcode) or fingerprint, etc. is successfully verified. Mobile device 12 then sends a token response 28 to server 17. Token response 28 can include the payment token, payment amount, merchant identity, transaction time, transaction identity, etc. Server 17 receives token response 28 and sends a payment response 30 to PC 14. The transaction identity from payment request 24 can be used by server 17 to send payment response 30 to PC 14. Payment response 30 can include payment token, payment amount, merchant identity, transaction time, transaction identity, status code, etc. The status code can be used to indicate an error scenario if payment request 24 has an error, like mobile identity is not correct and the like. If everything is working properly, the status code is 'Success'. Alternatively, payment response 30 can additionally include billing information (e.g. billing address, zip code, name, and phone number) that was provided in the registration procedure earlier by the user to server 17. In this case, the user does not need to enter billing information on the web page of online store 16 during purchase.

PC 14 receives payment response 30 and sends an authorization request 32 to online store 16. Authorization request 32 can include payment token, payment amount, merchant identity, transaction time, transaction identity, etc. Online store 16 then sends an authorization request 34 to payment network 20. Payment network 20 processes the transaction and replies with an authorization response 36 to online store 16. Online store 16 sends an authorization indication 38 to PC 14 to indicate the status, e.g. approval and completion, of the purchase. While functional and providing a system and method previously unknown, this system and method requires a login which can be inconvenient to the user. Furthermore, if the user forgets the user name and password, it may be very painful to retrieve and update. Therefore, a solution for an easier and more convenient user experience is needed.

It would be highly advantageous, therefore, to remedy the foregoing and other deficiencies inherent in the prior art.

SUMMARY OF THE INVENTION

Briefly, to achieve the desired objects and advantages of the instant invention, provided is a mobile payment method including the steps of providing a web browsing capable device, a mobile payment device having mobile payment capability and a server connectable to the web browsing capable device and the mobile payment device. A user uses the web browsing capable device in communication with the Internet to make an online purchase at an online store and receive payment information including a server address. The web browsing capable device connects to the server using the server address. A VID is input into the web browsing capable device and a payment request including the VID is sent from the web browsing capable device to the server. The server verifies the VID. The mobile payment device is connected to the server. A token request is sent from the server to the mobile device upon verification of the VID. A token response is sent from the mobile device to the server. Information is archived to a database and a cookie associated with the VID is created. The cookie with associated VID is archived in the database. A payment response including the created cookie associated with the VID is sent to the web browsing capable device from the server. An authorization request is sent to the online store from the web browsing capable device, and the online store authorizes the transaction with a payment network.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 2:
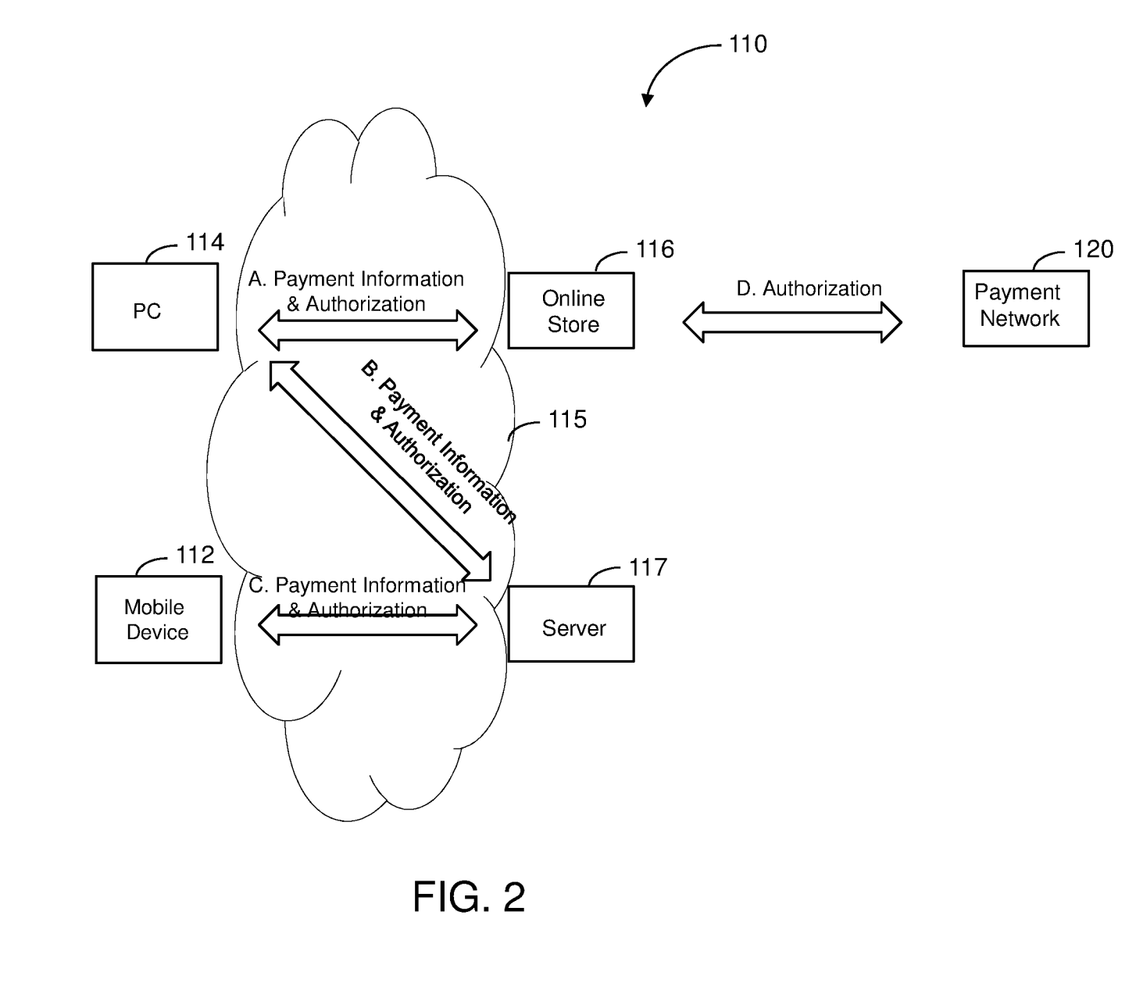
FIG. 2 is simplified block diagram of a payment system according to the present invention.

Turning now to the drawings in which like reference characters indicate corresponding elements throughout the several views, attention is first directed to FIG. 2 which illustrates a payment system 110 including a mobile payment device 112 and a PC 114 (web browsing capable device). Mobile payment device 112 is a device with computing capability and is embedded with a secure element or utilizes emulation software to emulate a secure element to securely store credit/debit card information, payment credentials, one-time credit/debit card number, payment token, digital currency, etc. Mobile payment device 112 can be a smart phone, a tablet, a wearable device (e.g. watch), or even a laptop computer, embedded with a secure element or utilizing emulation software to emulate a secure element, that stores credit/debit card, payment credentials, one-time credit/debit card number, payment token, digital currency, etc. Currently mobile payment platforms include Apple Pay, Android Pay, Samsung Pay and the like. PC 114 can be any browser capable device such as a desktop computer, a laptop computer, a tablet computer, mobile phone (or smart phone), self-checkout kiosk, etc. to browse products of the online store. In this case, PC 114 is either incapable of mobile payment, or mobile payment is undesirable from that specific device. System 110 enables a secondary device, in this case mobile payment device 112 to pay for online purchases at online store 116 made from PC 114. It will be understood that the term online refers to communication through a world wide web such as the Internet 115, a global communications network. Many users prefer to browse on a larger device such as a desk-top computer, a lap-top computer, a tablet computer, and the like, because a larger viewing area is provided. Unfortunately, mobile payment is not available on many of these systems. System 110 allows browsing on a PC 114 while facilitating payment with a mobile payment device 112.

To allow communication with mobile device 112, thereby providing payment, a server 117 is provided to couple PC 114 to mobile device 112. During the purchase process, PC 114 receives payment information from online store 116 through an interface A. PC 114 sends the payment information to server 117 via an interface B. Server 117 then forwards the payment information to mobile device 112 via an interface C. As will be understood, interfaces A, B, and C can be wireless or wireline connections through a network (Internet 115) such as the world wide web. In addition, the connection for interface A can be initiated by the browser of PC 114, and the connection for interface B can be initiated by the browser of PC 114 as well. Mobile device 112 sends an authorization request with a payment token to server 117 via interface C, and then server 117 forwards the authorization request with payment token to PC 114 via interface B. At this point, PC 114 is able to send the authorization and payment token to online store 116. It will be understood that server 117 is preferably a separate entity from a server of online store 116. Server 117 can be operated by a third party company or can be owned by online store 116. An advantage of system 110 is that online store 116 only use a standard connection, interface A, with PC 114, to provide payment information and receive authorization requests, and therefore only a minimum change to online store 116 is needed.

As an example of general use, PC 114 connects to online store 116 via interface A of Internet connection 115. Mobile device 112 is capable of mobile payment and is reachable by server 117 using interface C of Internet link 115 to exchange mobile payment messages. Mobile device 112 can use 2G, 3G, or 4G cellular networks, or home, private or public Wi-Fi as the access technology of Internet 115. Server 117 connects between PC 114 and mobile device 112. Online store 116 connects to a payment network 120 (e.g. comprising payment gateway, acquirer, card network, and card issuer) through interface D to process the credit, debit or bank card transaction approval received from PC 114.

Figure 3:
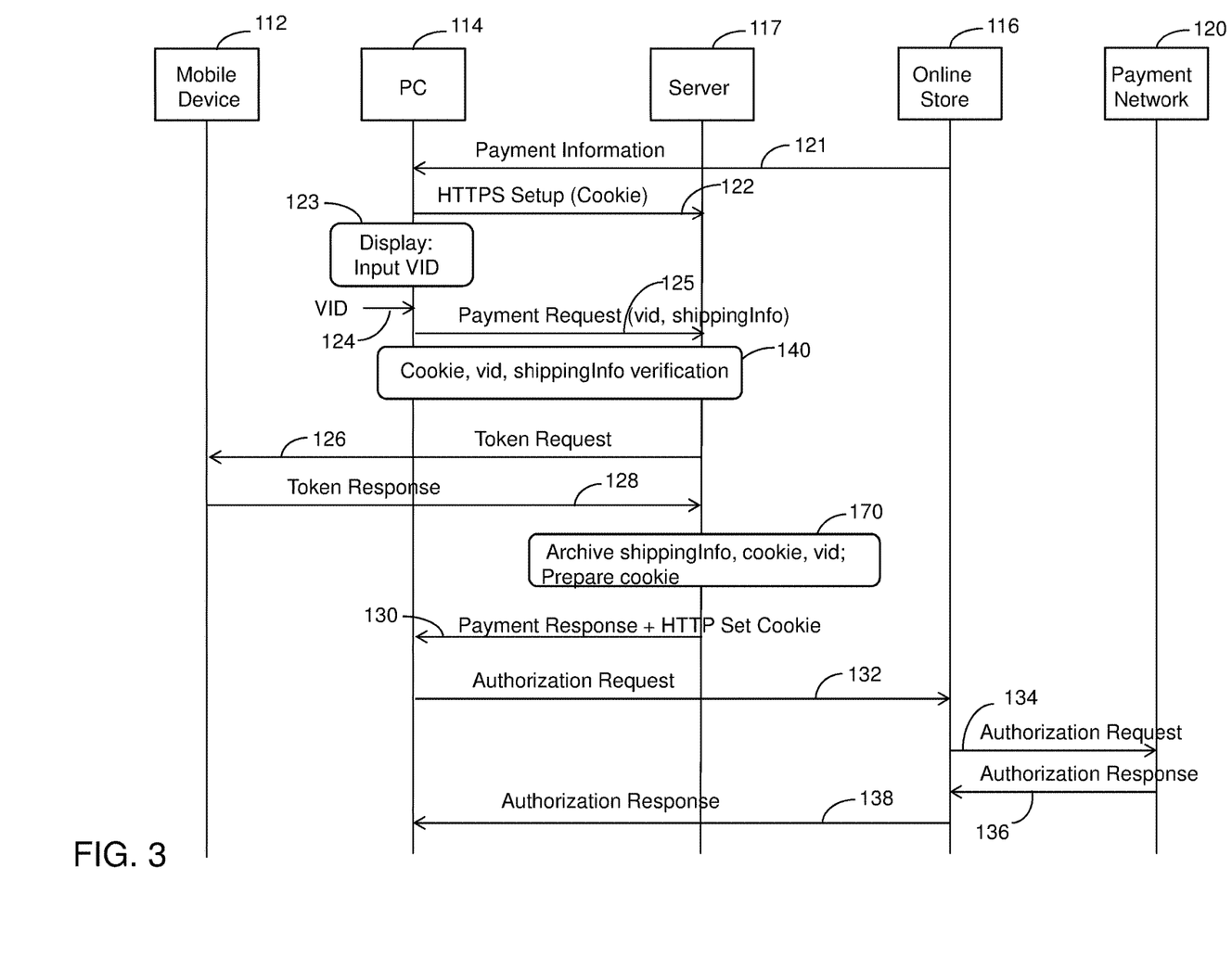
FIG. 3 is another schematic of the message exchange between elements of the payment system according to the present invention.

Turning now to FIG. 3, an example of the method steps for a mobile payment using system 110 is illustrated. After the user decides to make payment, and send to online store 116 purchase information, including the product to purchase, shipping information, billing information, etc., online store 116 sends payment information 121 to PC 114. Payment information 121 can include payment amount, merchant identity, transaction time, transaction identity, billing information, the address of Server (e.g. HTTP URL address), etc. PC 114 uses HTTP CORS (Cross-Origin Resource Sharing) to switch to another context and set up a HTTPS session 122 to Server 117 using the address of Server 117 received in Payment information 121, e.g. xyz.com. In HTTP Header sent from PC 114 to Server 117, PC 114 includes a cookie if there is some stored at PC 114 for this domain, e.g. xyz.com. PC 114 displays input VID 123 on the form requesting input of a VID, where VID is verification identity for the access to this payment service. The user inputs VID 124. PC 114 sends a payment request 125 to Server 117. Server 117 receives payment request 125 including cookie, VID and shipping information. Server 117 then verifies this information and can perform additional procedures, by a sub-routine 140 as will be described presently.

When Server 117 completes the verification procedure, server 117 sends a token request 126 to Mobile Device 112 to request payment token of Apple Pay, Android Pay, Samsung Pay and the like. Mobile Device 112 receives payment information, displays payment description for the user to check, and prompts user to authorize by PIN or biometric information (e.g. fingerprint). Then Mobile Device 112 sends a token response 128 with payment token to Server 117 upon authorization. Server 117 receives token response 128 successfully and archives shipping information, cookie, VID, and can prepare new or update cookie in a sub-routine 170 as will be described presently. Server 117 sends payment response 130 to PC 114. Payment response 130 includes payment token, etc. The HTTP header of payment response 130 includes a set cookie as will be described presently. PC 114 receives payment response 130 and sends an authorization request 132 to Online Store 116. Authorization request 132 includes payment token, payment amount, merchant identity, transaction time, transaction identity, etc. Online Store 116 sends authorization request 134 to Payment Network 120. Payment Network 120 processes the transaction and replies with an authorization response 136 to Online Store 116. Online Store 116 sends an authorization response 138 to PC 114 to indicate the status, e.g. approval and completion of purchase.

Figure 4:
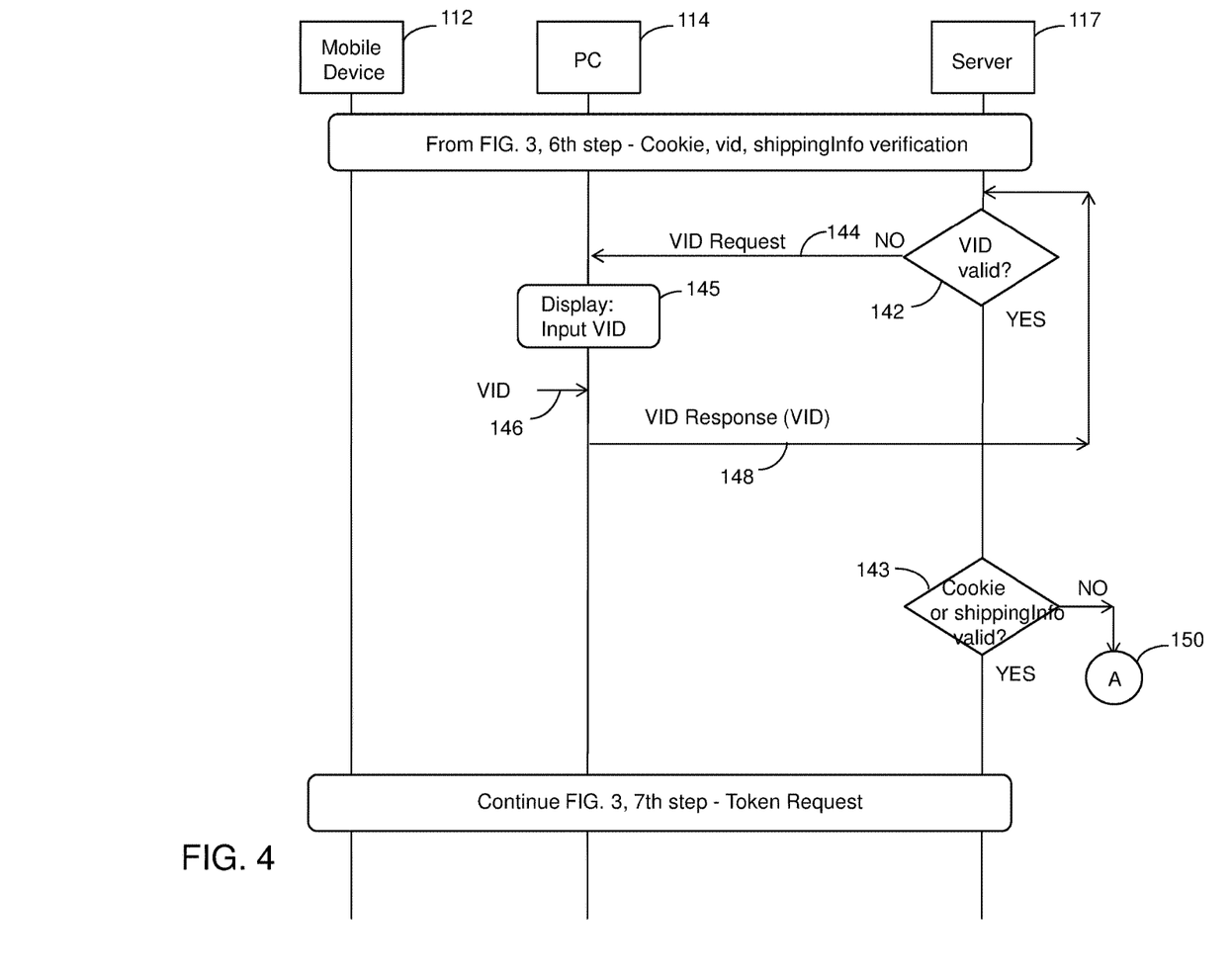
FIG. 4 is a schematic of the message exchange between elements of the payment system specifically related to a sub-routine.

Referring now to FIG. 4, sub-routine 140 in which server 117 verifies the information in payment request 125 is illustrated. When Server 117 receives the VID in payment request 125, server 117 will verify VID 142 to determine if the VID is valid, e.g. registered and non-blocking. If the VID is valid (i.e. YES), server 117 verifies if the cookie is valid 143. If the VID is not valid, server 117 sends a VID request 144 to PC 114 to request the user to reenter a valid VID. PC 114 receives VID request 144 and displays a form 145 for the user to enter a VID. The user then inputs a VID 146. PC 114 sends a VID response 148 containing the input VID 146 to Server 117 for re-verification at verify VID 142. Once the VID has been verified, server 117 verifies if the cookie is valid 143, meaning a cookie is included in HTTPS set up 122 (or payment request 125), there is no public cookie, and the cookie is archived in a database of server 117 that contains this VID with time stamp of last success token response 128 within a time period, such as 6 months. Alternatively, shipping information of VID in the database is matching (i.e. either a) shipping information matches archived shipping address in the database for this VID, or b) there is matching billing address). If yes, token request 126 is sent. If no match is made, a sub-routine 150 is entered into.

Figure 5:
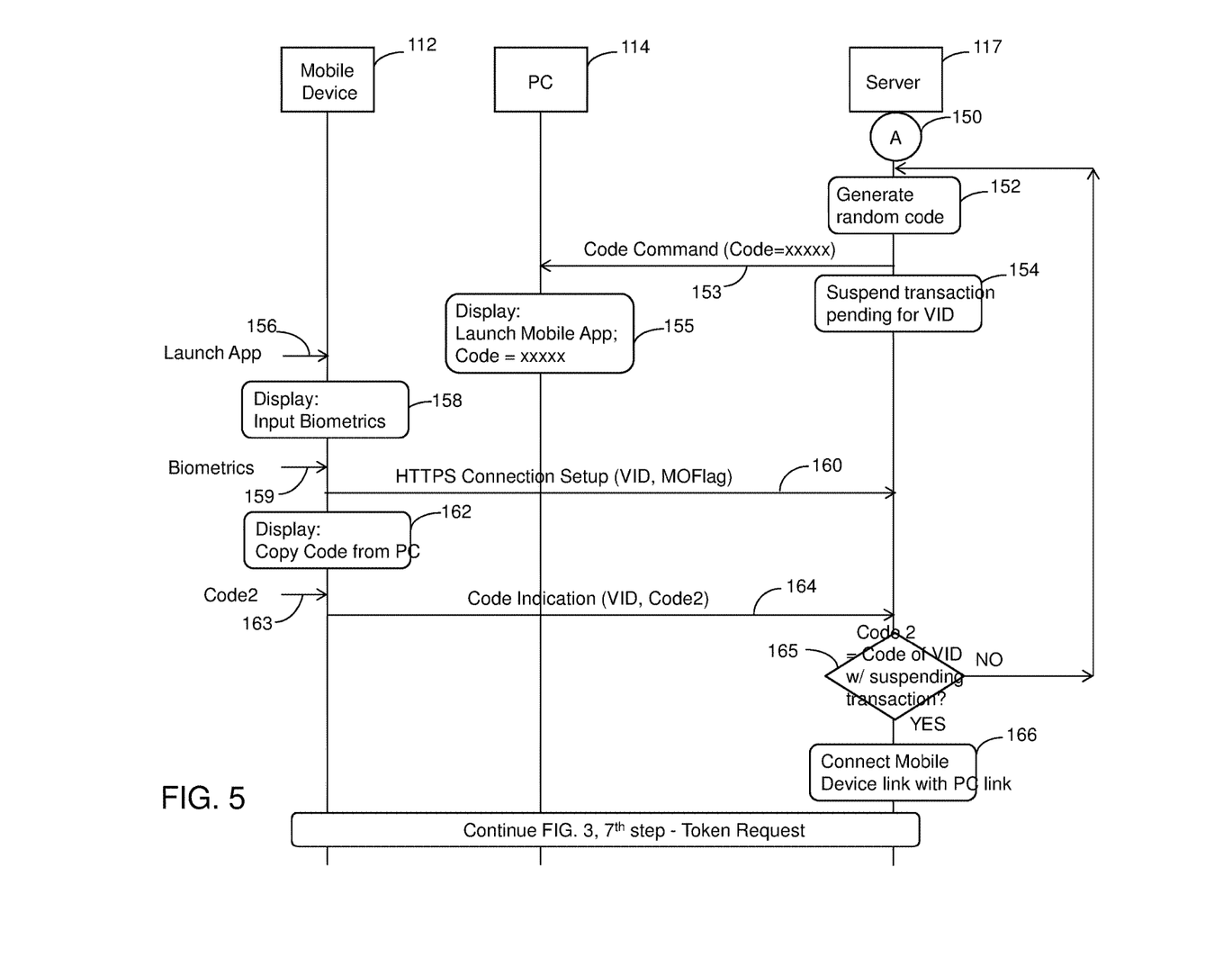
FIG. 5 is a schematic of the message exchange between elements of the payment system specifically related to a another sub-routine.

Turning now to FIG. 5, sub-routine 150 is illustrated. Server 117 needs to cross verify the user between PC 114 and Mobile Device 112. Server 117 generates a random code 152, e.g. 5 alphanumerical digits. Server 117 sends a code command 153 to PC 114 requesting a code check, including the random code be input by the user. Server 117 suspends the transaction 154 pending for VID. PC 114 receives code command 153 and displays an instruction 155 on the screen of PC 114. The displayed instruction 155 informs the user to launch mobile app and copy the pass code shown on PC 114 to Mobile Device 112. The user launches the mobile app 156 on mobile device 112. Mobile app of Mobile Device 112 can prompt 158 the user to provide biometric information, e.g. fingerprint (alternatively, the user needs to enter PIN code of using this mobile app). The user enters biometric information 159 (alternatively, the PIN code). After verifying biometric information (or PIN code) to be correct, Mobile Device 112 requests to set up a secured HTTPS connection 160 with Server 117. The address of Server 117, e.g. URL, can be configured in the mobile app. Mobile Device 112 identifies the connection setup originated from a mobile app associated with a VID as opposed to a Server initiated request; VID and MOFlag (Mobile Originated Flag) are indicated to Server 117 in the request 160. Mobile Device 112 prompts 162 the user to copy the pass code displayed 155 on PC screen. The user enters 163 the pass code on Mobile Device 112. Mobile Device 112 sends code indication 164 to Server 117 with the pass code entered by the user which is identical to the pass code generated by server 117 and sent to and displayed by PC 114. Server 117 receives code indication 164 from Mobile Device 112 on the mobile link identified by VID and verifies 165 if the received code is the same as the code generated earlier 152 by server 117. If the entered pass code does not match the generated pass code the process begins again with another pass code generated 152 by server 117 and sent to PC 114. If the codes match, Server 117 resumes the transaction and connects Mobile Device 112 to Server link with the PC to Server link for forwarding messages between the two links 166. The procedure continues with token request 126 being sent.

Figure 6:
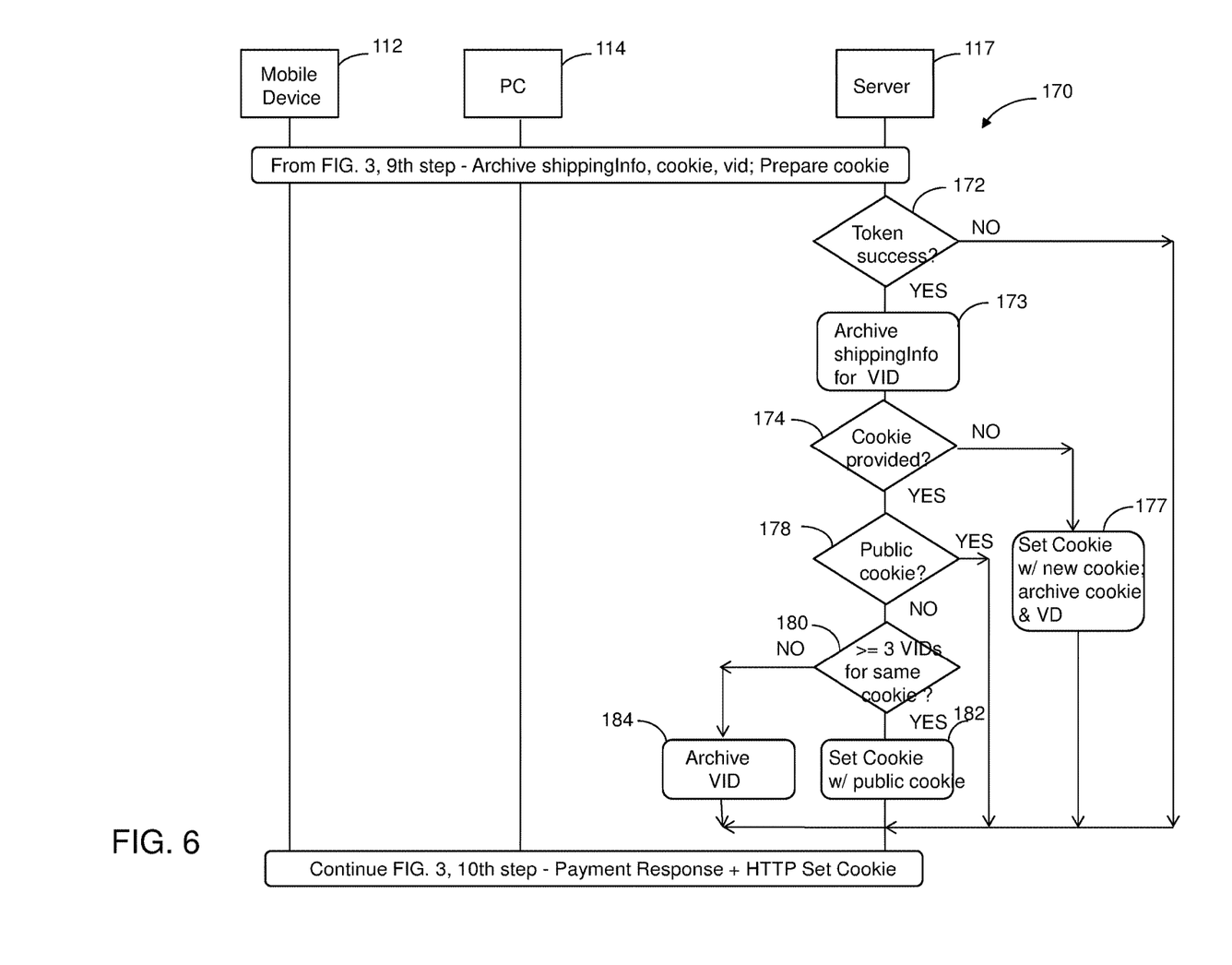
FIG. 6 is a schematic of the message exchange between elements of the payment system specifically related to yet another sub-routine.

Referring now to FIG. 6, sub-routine 170 in which Server 117 receives token response 128 and determines if the token was successful or not 172. If token response 128 completes successfully (i.e. the user authorizes the transaction and Mobile Device 112 replies with token response 128 including a valid payment token), the process continues with Payment response 130 being sent by server 117 to PC 114 and includes payment token, etc. The HTTP header of payment response 130 includes a set cookie. When token response 128 is received with a token included, if Server 117 receives shipping information in payment request 125, Server 117 archives 173 this information of this VID to be used in the future verification, if this shipping information was not previously submitted. Server 117 determines 174 if there is any cookie included by PC 114 in HTTPS setup 122. If a cookie was included Server 117 checks 178 if there is a public cookie. If there is no cookie, Server 117 generates 177 a new cookie (i.e. non-public), and will include the new cookie in payment response 130 and set expiry time to far out in the future (e.g. Expires=Sat, 1 Jan. 2050 00:00:00 GMT). Server 117 creates this cookie (i.e. storing value field of the cookie), adds VID in the VID list of this cookie and updates time stamp of success token response of this VID of this cookie with transaction time in the database. The process then continues with Payment response 130 being sent by server 117 to PC 114 and includes payment token, etc. In the next step in the process, server 117 checks 178 if there is a public cookie. If there is a public cookie, the process continues with Payment response 130 being sent by server 117 to PC 114. If there is no public cookie, Server 117 checks 180 if the number of VIDs associated with provided cookie is >=3. If yes, Server 117 generates a new public cookie 182, and will include the new public cookie in payment response 130 (i.e. include HTTP Header Set-Cookie with this public cookie) and set expiry time to far out in the future (e.g. Expires=Sat, 1 Jan. 2050 00:00:00 GMT) for this new public cookie and delete all non-public cookies (i.e. include HTTP Header Set-Cookie with any non-public cookie received in HTTPS setup 122). If the number of VIDs associated with provided cookie is <3, in step 180, Server 117 archives VID 184 for this cookie. If this VID cannot be found in the VID list of this cookie in the database, Server 117 adds this VID into the VID list of this cookie and updates time stamp with transaction time of this VID of this cookie in database and the process continues with Payment response 130 being sent by server 117 to PC 114. While the above check to determine the number of VIDs sharing the same cookie has been described as being equal to or more than 3, it will be understood that this is simply an example and the threshold used can be other than 3. In the preferred embodiment, the process uses a persistent HTTP cookie per PC to track the VIDs of a PC. An alternative is to have a cookie per PC per VID and each cookie can be affective for some time, say 6 months.

Figure 7:
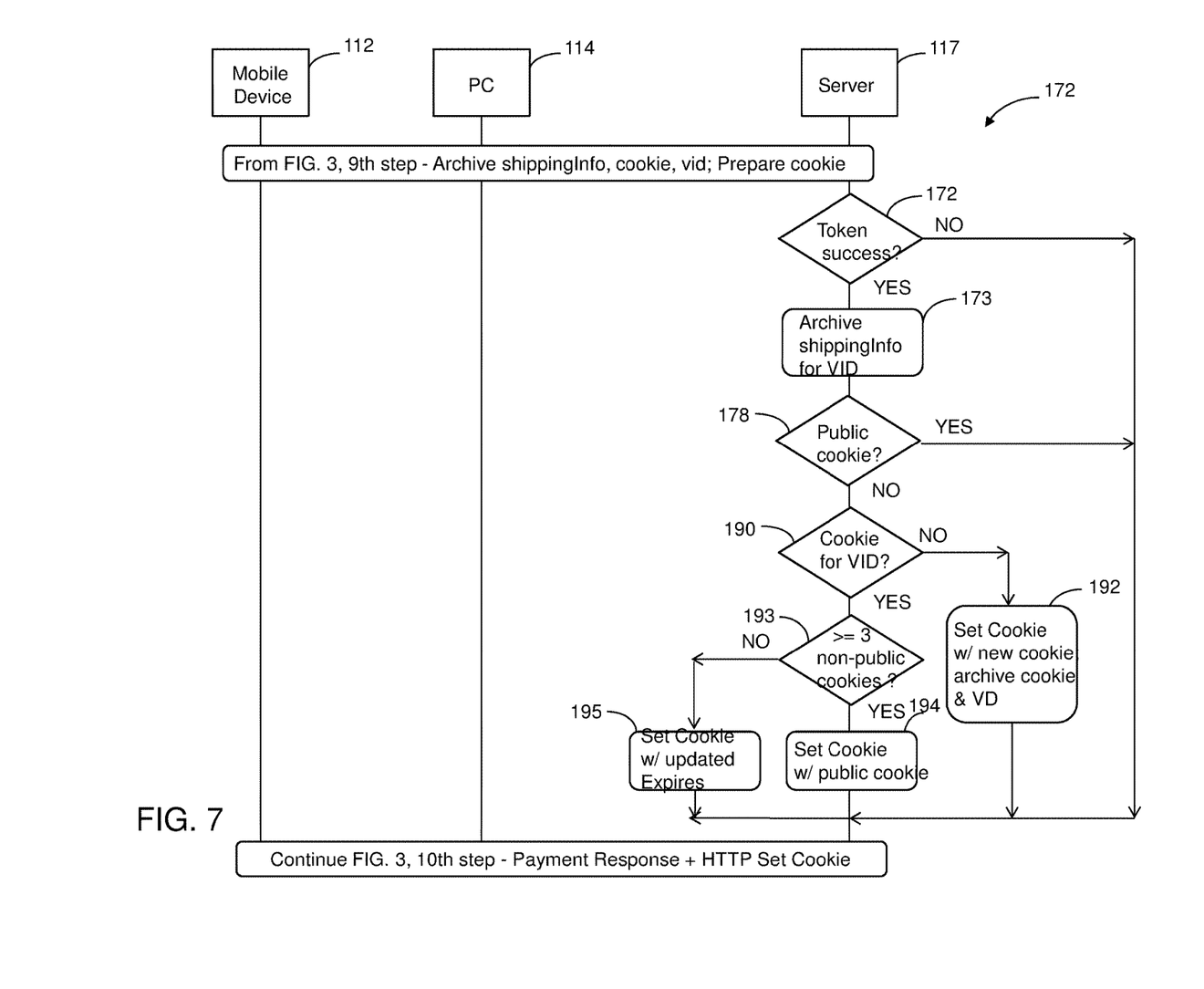
FIG. 7 is a schematic of an alternate message exchange between elements of the payment system specifically related to the sub-routine illustrated in FIG. 6.

Turning now to FIG. 7, an alternate sub-routine 170 is illustrated. In this sub-routine 170, the initial steps are identical to those disclosed in FIG. 6, up to Server 117 checking 178 if there is public cookie. If there is a public cookie, the process continues with Payment response 130 being sent by server 117 to PC 114. If there is no public cookie, Server 117 checks 190 if the cookie exists in the database for this VID. If a cookie does not exist for this VID, Server 117 archives 192 this cookie value in the database, and VID for this cookie. Server 117 also generates a new cookie (i.e. non-public), and will include new cookie in payment response 130 (i.e. include HTTP Header Set-Cookie with this cookie) and set expiry time to current date plus, for example, 6 months (i.e. Expires=current date+6 months) for this new cookie. The process then continues with Payment response 130 being sent by server 117 to PC 114. If a cookie does exist for this VID, then server 117 checks 193 if a total number of cookies (i.e. non-public) in received HTTP Header in HTTPS setup 122 is equal to or greater than 3. If it is Server 117 generates 194 a new public cookie, and will include new public cookie in payment response 130 (i.e. include HTTP Header Set-Cookie with this public cookie) and set expiry time to far out in the future (e.g. Expires=Sat, 1 Jan. 2050 00:00:00 GMT) for this new public cookie and delete all non-public cookies (e.g. include HTTP Header Set-Cookie with other non-public cookie and Expires=Sat, 1 Jan. 2000 00:00:00 GMT). The process then continues with Payment response 130 being sent by server 117 to PC 114. If it is not, the effective time of the cookie is updated 195 to current date plus, for example, 6 months in payment response 130 (i.e. include HTTP Header Set-Cookie with this cookie and Expires=current date+6 months). The process then continues with Payment response 130 being sent by server 117 to PC 114.

However, the above check with number of cookies equal to or more than 3 is an example. The threshold can be other than 3 non-public cookies. Additionally, the above effective time updated with an additional 6 months is an example. The additional time period can be durations other than 6 months. Accordingly, the step 143 of verifies if the cookie is valid can change the way that cookie is valid. Server 117 verifies if the cookie is valid (i.e. cookie is provided, there is no public cookie, and cookie is archived in database for this VID) or shipping information of VID in the archive is matching (i.e. either a) shipping information matches shipping address in the archive for this VID, or b) there is matching billing address).

Figure 8A:
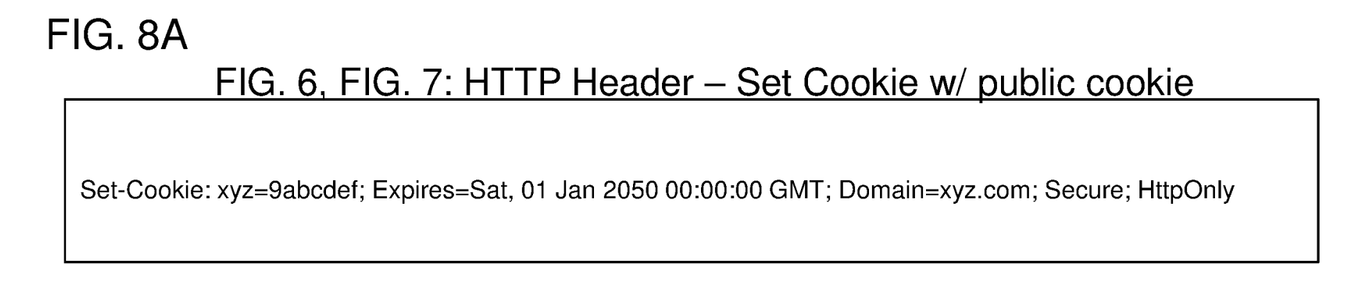
FIGS. 8A-C, illustrate examples of set-cookies.
Figure 8B:
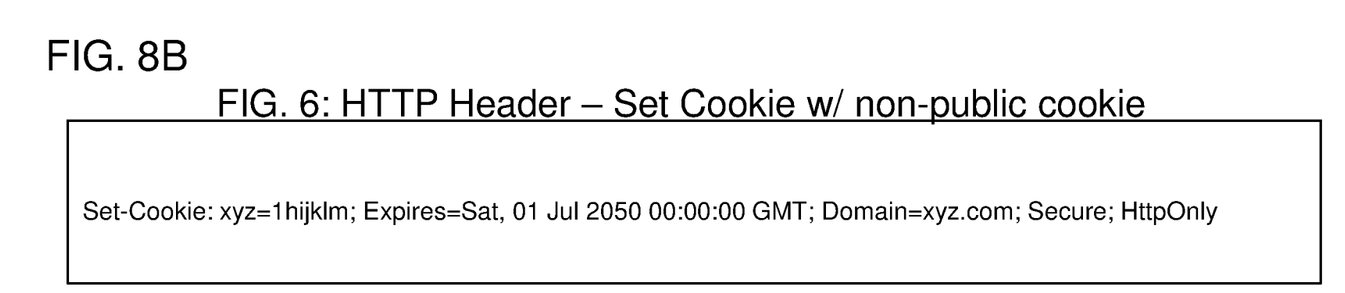
Figure 8C:
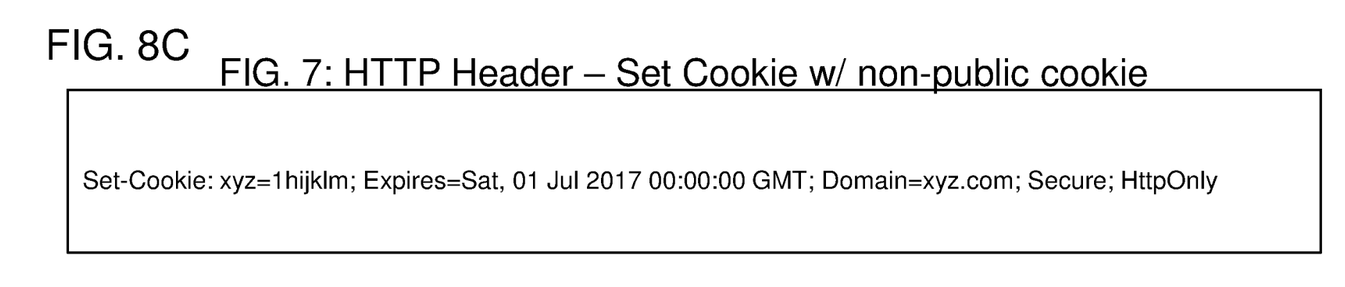

Referring to FIGS. 8A-C, examples of cookie formats in Set-Cookie of HTTP Header for three cases is shown. FIG. 8A shows public cookie in FIG. 6, FIG. 7. FIG. 8B shows non-public cookie (i.e. persistent cookie) in FIG. 6. FIG. 8C shows non-public cookie (e.g. 6-month effective time of cookie) in FIG. 7.

The cookie is configured using Secure and HTTP Only options to allow only HTTPS to access and prevent cross-site scripting (XSS) attacks. The cookie has name=value (e.g. xyz=9abcdef) definition where the name field relates to Server's HTTP address and value is created to allow uniqueness of each cookie. To differentiate public or non-public cookies, the value field can use different sets of values. One example is that public cookie can start with a specific digit, say 9, while non-public cookie can start with other specific digits than 9, for example 1 as shown in FIGS. 8B and 8C. Another example is that the name field can use different characters. For example, public cookies can have "xyzpublic" while non-public cookie can have "xyz", etc. Expires for the public cookie is set to far future, say Sat, 1 Jan. 2050 00:00:00 GMT, while a non-public cookie can expire current time plus some fixed time, say 6 months in FIG. 7. In FIG. 6, non-public cookies are persistent as well, and Expires is set to far future say Sat, 1 Jan. 2050 00:00:00 GMT. Domain can be set to Server's HTTP address, e.g. xyz.com.

In FIG. 6, Server 117 creates a cookie per PC 114 and needs to have a database to archive each non-public cookie and associated VID list. Each record in the database can consist of cookie value, VID list, time stamp of last success token response for VID in the list. Time stamp can be used to check if a VID has not been accessed for some time and therefore authentication in FIG. 5 is required.

In FIG. 7, Server 117 creates a cookie per PC 114 per VID and needs to have a database to archive each non-public cookie and associated VID. Each record in the database can consist of cookie value and VID. Time stamp is not stored because the Expires field is set current time plus additional time period. If the user re-accesses after that additional time period, there is no cookie for this VID included in HTTPS setup 122 and therefore authentication in FIG. 5 is required.

Figure 9:
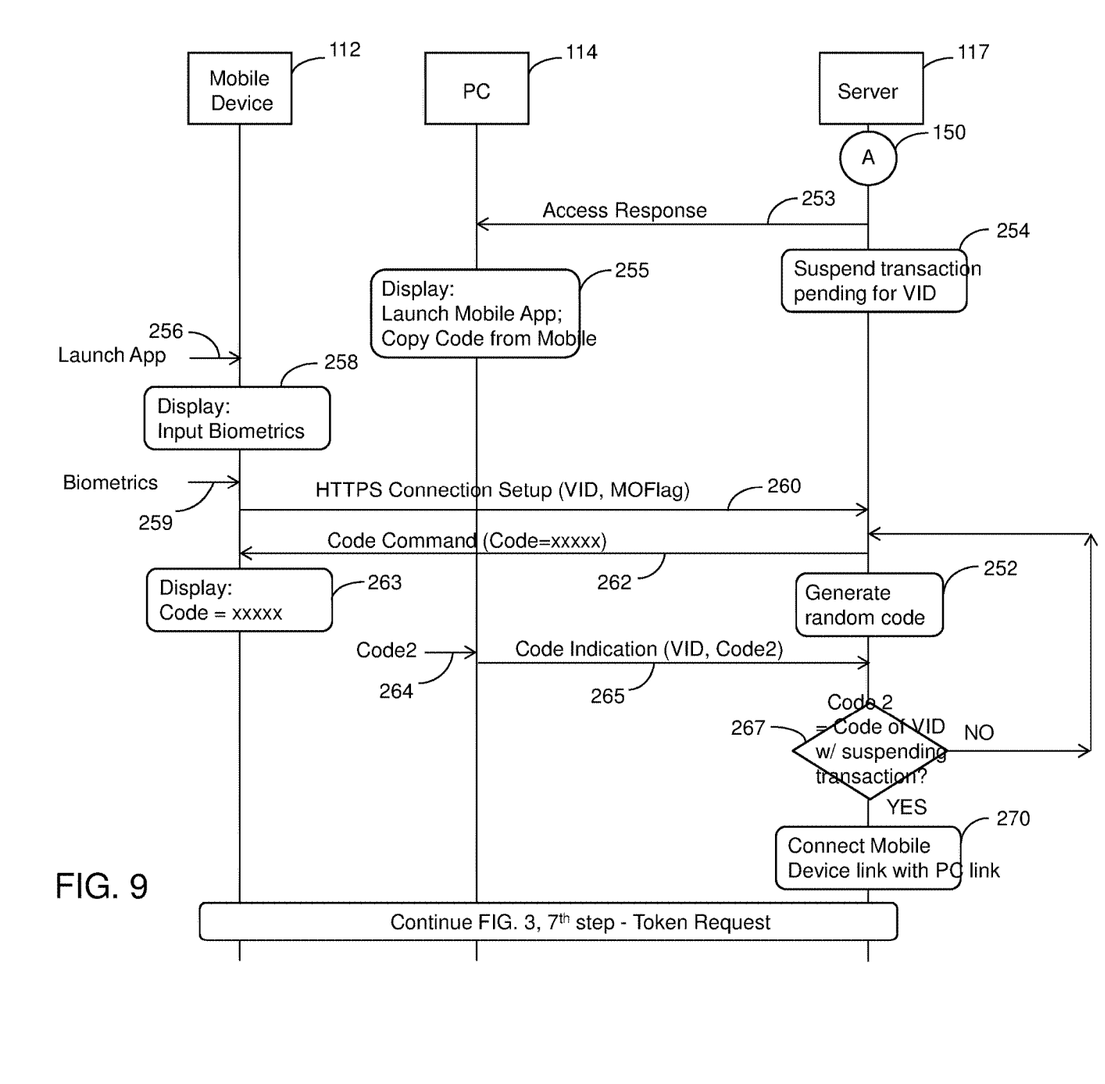
FIG. 9 is a schematic of an alternate message exchange between elements of the payment system specifically related to the sub-routine illustrated in FIG. 5.

Turning now to FIG. 9, an alternate to the process described in FIG. 5 is illustrated. In this procedure, Server 117 sends a one-time pass code to Mobile Device 112 and user enters the same code to PC 114 to verify. Server 117 has only valid VID and needs to cross verify between PC 114 and Mobile Device 112. Server 117 sends access response 253 to PC 114 to indicate failure due to pass code needed. Server 117 suspends the transaction 254 pending for the VID. PC 114 receives access response 253 and displays 255 information on the screen of PC 114 notifying the user to launch the mobile app of mobile device 112 and enter the pass code received from Mobile Device 112 to PC 114. The user launches 256 the mobile app. Mobile Device 112 prompts the user to provide biometric information 258, e.g. finger print, (alternatively, the user may need to enter PIN code of using this mobile app), and the user enters biometrics 259 (alternatively, the PIN code). After verifying biometric information (or PIN code), Mobile Device 112 requests to set up 260 a secured connection with Server 117. The address of Server 117, e.g. URL, may be configured in the mobile app. Mobile Device 112 can identify the connection setup originated from a mobile app associated with a VID and it is a mobile initiated request as opposed to a Server initiated request. VID and MOFlag (Mobile Originated Flag) are sent to Server 117. Server 117 generates a random code 252, e.g. 4 digits. Server 117 sends code command 262 to Mobile Device 112 with pass code included. Server 117 starts a timer to wait for code indication 265 (if timeout, Server 117 can retry the process). Mobile Device 112 receives code command 262 and displays 263 the code on the screen. The user enters 264 the pass code that was received from Mobile Device 12 on PC 114. PC 114 sends code indication 265 to Server 117 with pass code entered by the user. Server 117 receives code indication 265 from PC 114 on the PC link identified by VID and verifies if the received code is the same as the code generated early. If the codes do not match the process can continue by generating a new random number 252 and repeating the process. When the codes match, Server 117 resumes the transaction associated with the VID and connect mobile link with PC link 270 to forward messages.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A mobile payment method comprising the steps of:
providing a web browsing capable device;
providing a mobile payment device having mobile payment capability, the mobile payment device being separate and distinct from the web browsing capable device;
providing a server connectable to the web browsing capable device and the mobile payment device;
a user using the web browsing capable device in communication with the Internet to make an online purchase at an online store and receiving payment information including a server address from the online store;
connecting the web browsing capable device to the server using the server address;
inputting a VID into the web browsing capable device;
sending a payment request having information including the VID from the web browsing capable device to the server;
the server verifying the information included in the payment request including the VID;
connecting the mobile payment device to the server and sending a token request from the server to the mobile payment device upon verification of the VID;
sending a token response from the mobile payment device to the server upon verification and authorization by the user;
archiving information to a database at the server and creating a cookie associated with the VID,
archiving the cookie with associated VID in the database at the server;
sending payment response including created cookie associated with the VID to the web browsing capable device from the server;
sending authorization request to the online store from the web browsing capable device; and
the online store authorizing the transaction with a payment network.

2. A method as claimed in claim 1 wherein the step of connecting the web browsing capable device to the server includes the web browsing capable device using HTTP CORS (Cross-Origin Resource Sharing) to set up a HTTPS session with the server using the address of the server received in the payment information.

3. A method as claimed in claim 1 wherein the step of the server verifying information included in the payment request includes the steps of:
determining if the VID is valid;
sending a request from the server to the web browsing capable device to enter a valid VID for re-verification if the VID was determined to be invalid;
verifying if shipping information included in the payment request matches an archived shipping address or billing address in the database corresponding to the VID, if the VID is determined to be valid; and
generating a random code by the server to be entered by the user on one of the mobile device and the web browsing capable device if the shipping information is not valid.

4. A method as claimed in claim 1 further including the steps of:
using the web browsing capable device in communication with the Internet to make a second online purchase and receiving second payment information including the server address to initiate a second transaction;
inputting the VID into the web browsing capable device;
sending a second payment request having information including the VID and the created cookie associated therewith from the web browsing capable device to the server;
the server verifying information included in the second payment request;
connecting the mobile payment device to the server and sending a second token request from the server to the mobile device upon verification of the information included in the second payment request;
sending a second token response from the mobile device to the server upon authorization by the user;
archiving information received to the database and updating the created cookie at the server;
sending second payment response including updated cookie to the web browsing capable device from the server;
sending authorization request to the online store from the web browsing capable device; and
the online store authorizing the transaction with a payment network.

5. A method as claimed in claim 4 wherein the step of the server verifying information included in the payment request includes the steps of:
determining if the VID is valid;
sending a request from the server to the web browsing capable device to enter a valid VID for re-verification if the VID was determined to be invalid;
verifying if the created cookie is valid if the VID was determined to be valid, meaning the cookie has been archived in the database that contains the validated VID and the cookie is not a public cookie; and generating a random code by the server to be entered by the user on one of the mobile device and the web browsing capable device if the created cookie is not valid.

6. A method as claimed in claim 1 wherein the step of the mobile device receiving payment information includes the step of the mobile device displaying a payment description for the user to check, and prompting the user to authorize the transaction.

7. A method as claimed in claim 6 wherein the step of authorizing the transaction includes the user using one of a PIN and biometric information.

8. A method as claimed in claim 5 wherein the step of archiving information received to the database and updating the created cookie further including the steps of:

determining the number of VIDs with which the created cookie is associated, updating the cookie as a public cookie if the number of VIDs with which the created cookie is associated is greater than or equal to a selected threshold.

9. A mobile payment method comprising the steps of:
providing a web browsing capable device;
providing a mobile payment device having mobile payment capability, the mobile payment device separate and distinct from the web browsing capable device;
providing a server connectable to the web browsing capable device and the mobile payment device;
a user using the web browsing capable device in communication with the Internet to make an online purchase at an online store and receiving payment information from the online store including an address for the server to initiate a transaction;
connecting the web browsing capable device to the server using the address provided in the payment information, including sending a cookie from the web browsing capable device to the server, the cookie previously received by the web capable device from the server during a previous transaction and associated with a VID;
inputting the VID into the web browsing capable device associated with the cookie;
sending a payment request including the VID and the cookie from the web browsing capable device to the server;
the server verifying the VID and cookie included in the payment request;
connecting the mobile payment device to the server and sending a token request from the server to the mobile device upon verification of the VID and cookie included in the payment request;
sending a token response from the mobile device to the server upon authorization by the user;
archiving information received to a database at the server and updating the cookie if the token response is a success;
sending payment response including updated cookie to the web browsing capable device from the server;
sending authorization request to the online store from the web browsing capable device; and
the online store authorizing the transaction with a payment network.

10. A method as claimed in claim 9 wherein the step of connecting the web browsing capable device to the server includes the web browsing capable device using HTTP CORS (Cross-Origin Resource Sharing) to set up a HTTPS session with the server using the address of the server received in the payment information.

11. A method as claimed in claim 9 wherein the step of the server verifying VID and cookie included in the payment request includes the steps of:

determining if the VID is valid;

sending a request from the server to the web browsing capable device to enter a valid VID for re-verification if the VID was determined to be invalid;

verifying if the cookie is valid if the VID was determined to be valid, meaning the cookie has been archived in the database that contains the validated VID with a time stamp of a last previously successful token response and the cookie is not a public cookie; and generating a random code by the server to be entered by the user on one of the mobile device and the web browsing capable device if the cookie is not valid.

12. A method as claimed in claim 9 wherein the step of the mobile device receiving payment information includes the step of the mobile device displaying a payment description for the user to check, and prompting the user to authorize the transaction.

13. A method as claimed in claim 12 wherein the step of authorizing the transaction includes the user using one of a PIN and biometric information.

14. A method as claimed in claim 11 wherein the step of archiving information received to the database and updating the cookie further including the steps of:

determining the number of VIDs with which the cookie is associated, updating the cookie as a public cookie if the number of VIDs with which the cookie is associated is greater than or equal to a selected threshold.

\* \* \* \* \*